June 16, 1953     F. H. MUELLER ET AL     2,642,229
TEMPERATURE RESPONSIVE RELIEF VALVE
FOR FLUID HEATING SYSTEMS Filed May 26, 1950     2 Sheets-Sheet 1

INVENTORS:
Frank H. Mueller,
Earl E. Tinker,
BY
ATTORNEYS.

June 16, 1953   F. H. MUELLER ET AL   2,642,229
TEMPERATURE RESPONSIVE RELIEF VALVE
FOR FLUID HEATING SYSTEMS
Filed May 26, 1950   2 Sheets-Sheet 2

INVENTORS:
Frank H. Mueller,
Earl E. Tinker,
BY Cushman Darby Cushman
ATTORNEYS.

Patented June 16, 1953

2,642,229

UNITED STATES PATENT OFFICE 2,642,229

TEMPERATURE RESPONSIVE RELIEF VALVE FOR FLUID HEATING SYSTEMS

Frank H. Mueller and Earl E. Tinker, Decatur, Ill., assignors to Mueller Co., Decatur, Ill., a corporation of Illinois Application May 26, 1950, Serial No. 164,558

8 Claims. (Cl. 236—99)

The present invention relates to a new and improved temperature responsive valve for fluid supplying heating systems and the like.

An important object is to provide a quick opening temperature relief valve of the automatic or re-seating type which is more positive and accurate in operation than valves heretofore available, and which permits complete replacement of all the working parts through the top of the valve body without the necessity of disconnecting the valve body from the tank, boiler or other fluid heating system with which it is associated.

A further object is to provide means to prevent imposing an overloading pressure by the valve against its seat when the valve is moved to its closed position, by counterbalancing the pressure applied to close the valve by an opposing pressure sufficient to prevent severe embedding of the valve. In this connection, it might be mentioned it has been found that the commonly used beaded valve seat, when associated with a composition member or washer on the valve, is the most positive and efficient of any known type of seat, and requires less pressure to maintain it closed as long as it is kept clean and free of foreign matter. The ability of this type of seat to keep itself clean is greatly reduced as the seat embeds itself appreciably into the washer when the valve is moved to its closed position. Very little embedding will take place if the closing force or pressure is equal to or only in excess of the force required to effect a pressure seal. However, excessive loads will produce severe embedding and thus impair the efficient operation of the valve. In a temperature relief valve, embedding of the seat is objectionable since it not only increases the tendency to trap foreign material on the seating surface but also permits the valve seat to change its position and hence change the temperature at which the valve operates to relieve the excessive pressure. In fact, in extreme cases, embedding of the valve even prevents the valve from being properly seated. It will be seen that the elevated temperatures at which a relief valve is necessarily subjected increases the tendency of embedding the valve against its seat. Accordingly, another important feature of the invention comprehends the provision of a relief valve having a contacting surface of suitable durable composition material and which is arranged to be moved into contact with a beaded valve seat so as to provide an effective seal but without danger of being severely embedded into the seat.

Other objects and advantages of the invention will become apparent from the following description when taken in conjunction with the accompanying claims and drawings.

Referring to the drawings in which are shown several preferred embodiments of the invention:

Figure 1:
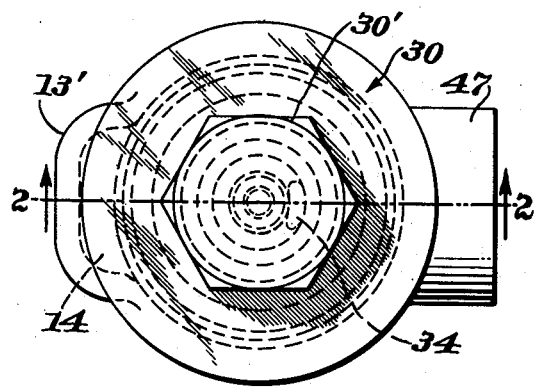
Figure 1 is a plan view of a relief valve constructed in accordance with the present invention.
Figure 3:
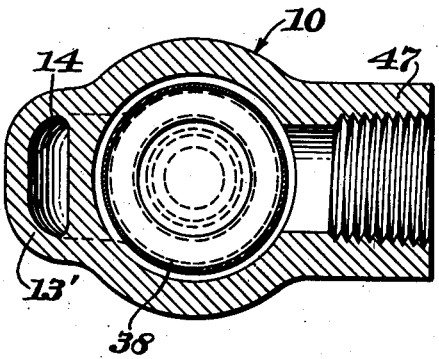
Figure 3 is a horizontal sectional view taken substantially along the line 3—3 of Figure 2.
Figure 2:
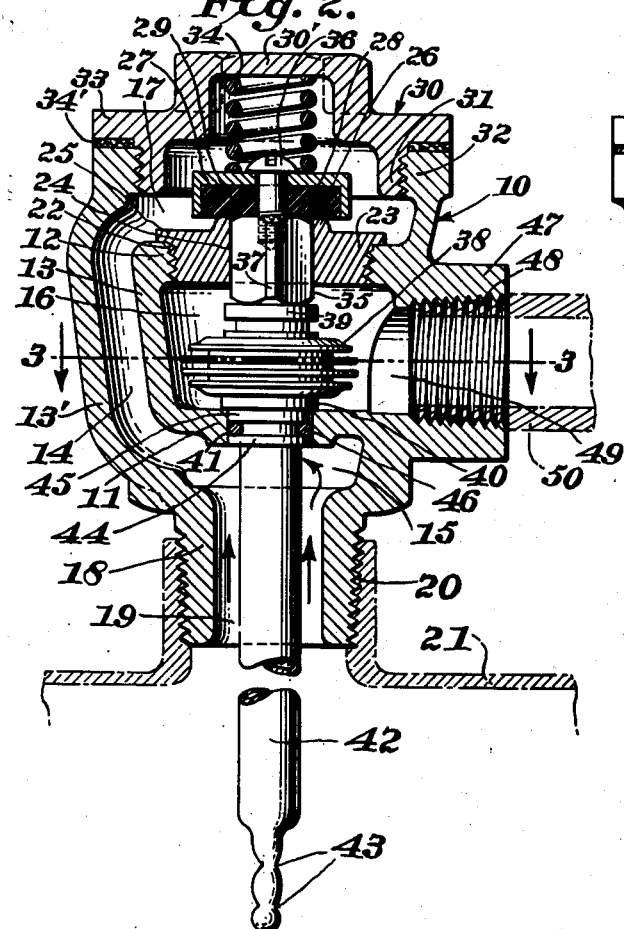
Figure 2 is a vertical sectional view taken substantially along the line 2—2 of Figure 1.
Figure 4:
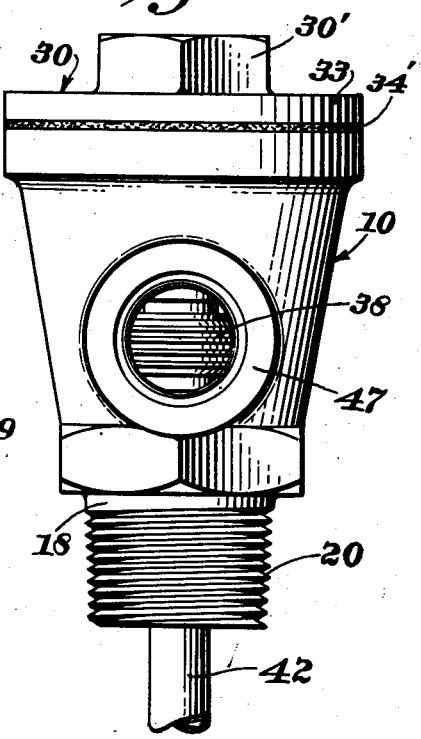
Figure 4 is an end view of Figure 1.
Figure 5:
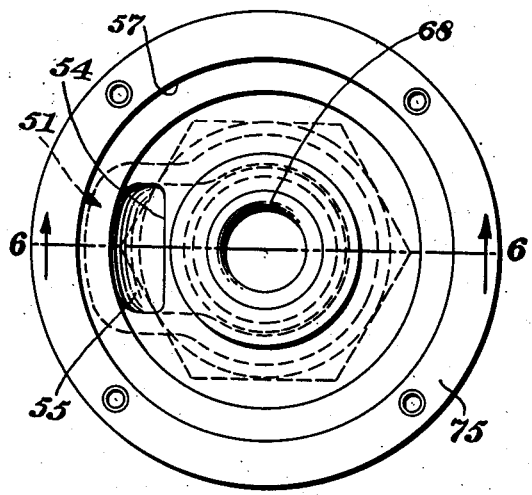
Figure 5 is a plan view of a modified form of the invention.
Figure 7:
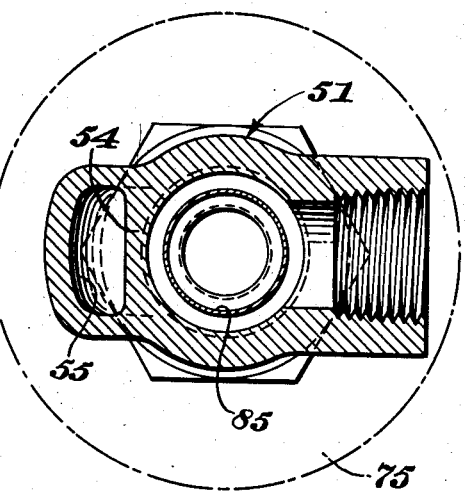
Figure 7 is a sectional view taken substantially along the line 7—7 of Figure 6.

Referring to the drawings, 10 indicates a valve housing or body of any suitable size and shape and which is interiorly formed with a lower transverse partition 11 and a vertically spaced upper transverse partition 12. The partitions 11 and 12 are connected together at their rear ends by a vertical wall 13 that is spaced from the adjacent outer wall 13' of the housing 10 to form a vertical passage 14. The vertically spaced partitions 11 and 12 also separate the interior of the housing 10 into a lower receiving chamber 15, an intermediate discharge chamber 16 and an upper chamber 17 which directly communicates with the lower chamber 15 through the passage 14. The valve body 10 is provided with a depending reduced lower end portion or neck 18 having a fluid inlet opening 19 and may be externally threaded as at 20 so as to be connected to a complementary formed portion of a suitable fluid heating system, such as the tank or boiler 21 (Fig. 2), so that if the fluid in the tank is subjected to excessive temperatures, it is allowed to escape through the relief valve.

The upper partition 12 has a centrally disposed opening, the wall of which preferably is internally threaded as at 22 so as to detachably receive the complementary threads on a valve ring member or plug 23 having a central opening 24 establishing communication of the upper chamber 17 with the intermediate chamber 16. The ring member 23 is also formed with an annular outwardly extending radial flange 25 that constitutes a stop or abutment for limiting the inward movement of the ring 23 when threaded to the partition 12. The ring member 23 adjacent the opening 24 has an outwardly extending annular bead or rim 26 that constitutes a valve seat arranged to be engaged by a reciprocating valve 27 which preferably is recessed as at 28 to receive a composition washer or insert 29 of any suitable material. The washer 29 is of such size and shape as to firmly contact the bead 26 when the valve is moved to its closed position so as to cut off the flow of the fluid from the upper chamber 17 into the intermediate chamber 16. The top of the valve 27 is closed by a cap 30 having a polygonal tool receiving head or portion 30'. The cap 30 is shaped so as to extend over the upper chamber 17 and has a depending externally threaded annular flange 31 arranged to be detachably connected to a complementary formed neck portion 32 of the housing. The cap 30 may also be formed with an annular outer flange 33 between which and the portion 32 is interposed a gasket 34' to provide a tight seal when the parts are assembled. A coil compression spring 34 is confined between the cap 30 and the valve 27 so as normally to urge the latter into yieldable engagement with its seat 26. The valve 27 has a depending guide member 35 secured thereto in any suitable manner such as by the threaded bolt 36 which may also be utilized to maintain the composition washer or surface 29 in position. The guide member 35 is preferably formed with circumferentially spaced radial ribs 37 which may be spaced substantially 90° apart in order to allow the fluid to pass from the upper chamber 17 into the intermediate chamber 16 when the valve is raised above its seat.

The operating thermal element of the valve 27 includes a bellows or "Sylphon" 38 which is positioned in the intermediate chamber 16 and has an upwardly extending tubular boss 39 which is normally slightly spaced from the lower end of the guide member 35 when the valve is in its normally closed position against its seat 26. The bellows 38 at its opposite or lower end has a depending boss or shoulder 40 arranged to engage the top of the lower partition 11. The partition 11 is formed with a central opening 41 coaxial with the opening 24 but of slightly smaller diameter and arranged to be overlapped by the shoulder 40 when the latter rests on the partition 11. A depending metal tube 42 constitutes a part of the thermal element and is secured at its upper end in any suitable manner to the bellows 38 and communicates with the interior thereof. The tube 42 and bellows 38 may be filled with a heat expansible or volative fluid and the lower end of the tube is closed in any suitable manner such as by crimping 43 so as to confine the fluid within the tube and bellows. The bellows 38 and tube 42 are axially slidable or displaceable relative to the openings 41 in the lower partition 11 and the tube 42 may be formed with spaced collars or shoulders 44 and 45 that provide an annular groove for receiving a suitable packing such as an O-ring or the like 46 that prevents the passage of the fluid from the lower chamber 15 into the intermediate chamber 16 and provides a tight seal or sliding fit upon axial displacement of the tube 42 and packing 46 relative to the opening 41. The casing or body 10 has a lateral tubular portion 47 internally threaded as at 48 to provide an outlet 49 that communicates with the intermediate chamber 16, and may be connected to a discharge pipe or the like 50 to withdraw the excess fluid delivered to the chamber 16 when the valve 27 is thermostatically operated to be raised away from its seat 26, upon the temperature of the fluid passing from the boiler 21 into the inlet port 19 and the lower compartment 15 of the relief valve, reaching a predetermined point.

The opening 22 in the upper partition 12 is of smaller diameter than the opening in the top portion 32 of the housing to which the cap 30 is connected and the diameter of the bellows 38 is smaller than the diameter of the opening 22 so that upon removal of the cap 30 and the ring member 23, the thermal element may initially be introduced through the top of the housing so that the tube 42 extends through the neck 18 into the tank or boiler 21 and the bellows 38 is positioned in the intermediate chamber 16. It will be seen that when the parts are assembled, the packing 46 has a sliding fit with the wall of the opening 41 in the lower partition 11 so as to insure a tight seal upon axial displacement of the thermal element. When the parts are in their normal closed position, the fluid in the tank 21 passes upwardly through the inlet 19 in the direction of the arrows (Fig. 2), and exerts and upward thrust on the tube 42 and the lower collar 44, prior to entering the passage 14 to be conducted to the upper chamber 17 where it coacts with the tension of the spring 34 to move and maintain the valve 25 normally against its seat 26. This upward pressure on the tube 42 and collar 44 raises the thermal element bodily and moves the boss 39 in contact with the guide 35 so as to exert an upward force or pressure on the underside or bottom of the valve 27 sufficient to counterbalance the combined downward pressure of the spring 34 and the pressure of the fluid in the upper chamber 17, thus providing means for preventing excessive embedding of the composition valve against its seat at the elevated temperatures to which the relief-valve is ordinarily subjected. As the diameter of the slidable or movable packing seal 46 is slightly less than the diameter of the opening 24 in the ring member 23, these two areas are proportioned to give the necessary added closure force required to effect a proper seal at higher pressures, with the result that the proper closure load is applied on the valve seat at all times under different or varying pressures. In other words, positive, efficient and economical means are provided to prevent pressure effects from overloading the seat 26 so that a suitable composition washer 29 with its structural practical advantages may efficiently be associated with the temperature responsive valve for controlling the discharge of the fluid when the latter reaches a dangerous or excessive temperature.

In operation, assuming the temperature relief valve to be associated with a tank or boiler, the temperature of the fluid, such as water in the tank 21, will be such as not normally to affect the closed position of the valve 27 against its seat 26 caused by the pressure of the spring 34 and the pressure of the fluid in the chamber 17. This downward or closing pressure is counterbalanced by the upward pressure or thrust exerted by the axial displacement of the thermal element which causes the boss 39 on the bellows 38 to exert an upward pressure against the guide member 37 so as to prevent excessive embedding of the composition contacting surface or washer 29 against its seat 26. When the temperature of the fluid passing into the valve 10 through the passage 14 and into the upper chamber 17 rises to a predetermined temperature or point, it will initially expand the bellows 38 which causes the lower portion of the bellows to move downwardly until the shoulder or collar 40 contacts the upper surface of the lower partition 11 adjacent the opening 41. Continued expansion of the bellows causes the upper portion thereof to move the boss 39 upwardly to raise the guide member 35 and lift the valve 27 away from its seat 26, so that the overheated liquid may escape from the upper chamber 17 into the intermediate chamber 16 and discharge through the outlet pipe 50.

Figure 6:
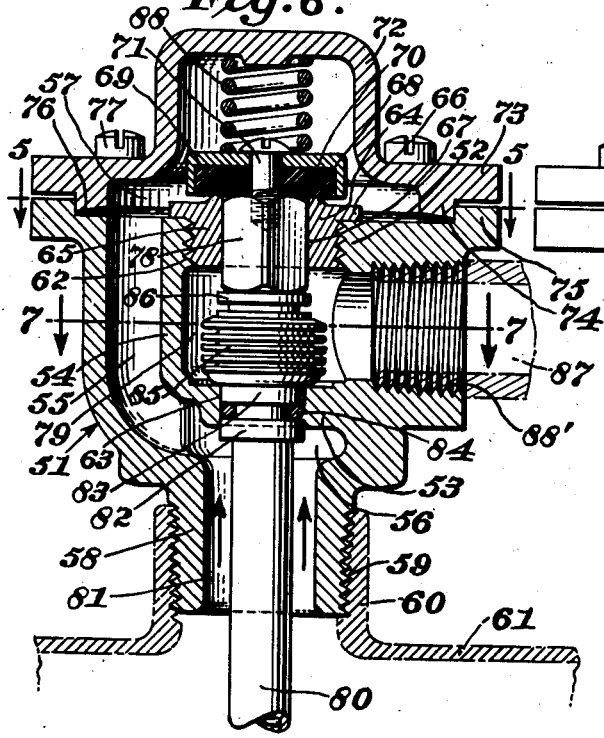
Figure 6 is a sectional view taken substantially along the line 6—6 of Figure 5.
Figure 8:
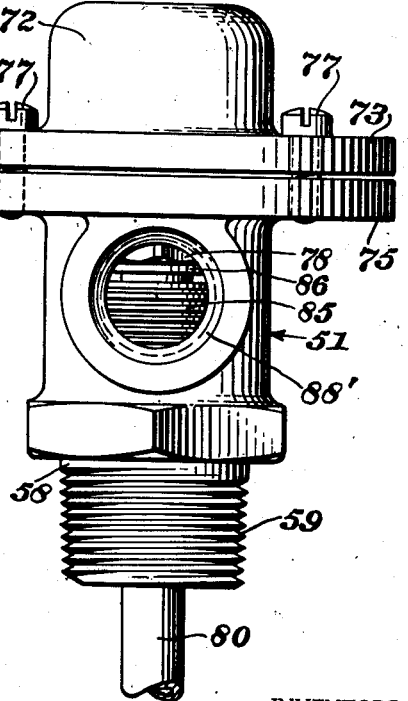
Figure 8 is an end view of Figure 5.

In the modification shown in Figures 5, 6, 7 and 8, while the valve structure is substantially similar to the form previously described, it has been re-designed and made more compact so as to reduce the size of the temperature relief valve. In this form, the valve housing or body 51 has the interior thereof provided with the upper partition 52 and lower partition 53 connected at their rear ends by the vertical wall 54 spaced from the outer wall of the housing 51 to form the passage 55 that communicates the lower receiving compartment 56 with the upper compartment 57. Depending from the valve body 51 is a reduced externally threaded neck 58 which is connected as at 59 to a tubular portion 60 of a supply tank or the like 61. The upper partition 52 is formed with an internally threaded opening 62 coaxial with a smaller opening 63 in the lower partition 53. A removable valve ring member 64 is provided with a depending reduced threaded portion 65 which is connected to the threaded wall of the opening 62. The ring member 64 is also formed with an upper annular flange 66 arranged to abut the upper surface of the partition 52 to limit the inward movement of the member 64 when it is connected to the valve body. The ring member 64 has a central opening 67 of slightly larger diameter than the diameter of the opening 63 and is formed with an outwardly extending annular bead or projection 68 that constitutes a seat for a composition washer 69 secured to the valve 70 by the threaded bolt 71 (Fig. 6). A removable cap 72 is connected to the top of the housing 51 so as to enclose the upper chamber 57 and preferably is formed with an outer radial flange 73 and a depending annular lug 74 that abuts a shoulder portion 75 on the top or neck of the valve housing 51. A gasket 76 may be interposed between the flange 73 and the portion 75 of the valve housing to provide a tight seal when the parts are assembled. The cap 72 may be releasably connected to the housing by the spaced threaded bolts 77 which extend through the complementary flange portions 73 and 75.

Depending from the valve 70 is a guide member 78 which is secured to the valve by the bolts 71 and normally projects through the opening 67 into the intermediate chamber 79. A tubular heat expandable actuating element 80 extends axially through the inlet port 81 and has spaced collars 82 and 83 between which is positioned an O-ring packing 84 that engages the adjacent wall of the opening 63 upon axial displacement of the tubular element 80 so as to provide a sliding fit seal for preventing the escape of fluid from the lower chamber 56 into the intermediate chamber 79. Connected to the upper end of the tubular element 80 is a bellows or "Sylphon" 85 which communicates with the interior of the element 80. The element 80 is filled with a suitable heat expansible fluid and has its lower end closed and extending into the boiler 61 so as to be operable in substantially the same manner as the thermal member 42 previously described. The upper end 86 of the bellows is in the form of an annular shoulder which normally is spaced from the lower end of the guide 78 but is arranged when the bellows is expanded upwardly to engage the guide member 78 so as to raise the valve from its normal closed position against its seat 68 in order to allow the fluid in the upper chamber 57 to escape into the intermediate chamber 79 and the discharge pipe 87 connected to the outlet port 88'. The valve 70 is normally urged to its closed position by a coil spring 88 which coacts with the pressure of the fluid in the upper chamber 57 to maintain the valve closed. The upward thrust imparted to the tubular element 80 by the pressure of the fluid being conducted into the valve causes the shoulder 86 of the bellows to be moved into contact with the guide 78 which, in turn, exerts upward pressure on the underside of the composition washer 69 so as to counterbalance the downward pressure on the opposite side of the valve and thus prevent excessive embedding of the valve against its seat.

It is significant to note that in both forms of the invention, means are provided for forming an automatic or re-seating quick actuating temperature responsive relief valve in which replacement of all the working parts can be obtained without removing the valve from the fluid heating systems with which it is connected, such as the boiler 61, and which is simple, efficient and accurate in operation. Moreover, all the movable parts, including the bollows, are positioned within the intermediate or discharge chamber so as not to be subjected to contact with foreign particles or corrosion which would cause the valve to stick or which might penetrate the necessarily thin bellows and cause the temperature element or thermostat to become inoperative. Additionally, means are provided to maintain the closure pressure exerted on the valve at a point just sufficient to effect sealing contact of the valve with its seat. The bellows is also positioned in the intermediate chamber so as to act as a deflector for directing the excess heated fluid into the outlet.

It will be understood that the forms of the invention shown and described are merely illustrative of preferred embodiments and that such changes may be made to the valve assembly as come within the scope of the following claims.

We claim:

1. A relief valve comprising a housing provided with vertically spaced upper and lower transverse partitions connected at their inner ends by a vertical wall spaced from the adjacent wall of the housing to form a passage therebetween, said partitions separating the interior of the housing into a lower chamber, an intermediate chamber and an upper chamber, said passage communicating the lower chamber with the upper chamber, said upper partition having an outwardly projecting valve seat and an opening communicating the upper chamber with the intermediate chamber, a movable valve arranged to engage said seat to close said opening, means for normally maintaining the valve against its seat, said lower partition having an opening registering with the opening in the upper partition, a thermal responsive device having a bellows positioned in said intermediate chamber and provided with an axially slidable depending tubular portion extending through the opening in the lower partition and into said lower chamber, and means for operatively connecting the bellows to the valve to raise the latter when the bellows is expanded upon the fluid in the lower chamber reaching a predetermined temperature.

2. A relief valve as called for in claim 1 in which the tubular portion of the thermal responsive device has a packing axially movable therewith and engaging the wall of the opening in the lower partition to seal the lower chamber from the intermediate chamber.

3. A relief valve comprising a housing provided with vertically spaced upper and lower transverse partitions connected at their inner ends by a vertical wall spaced from the adjacent wall of the housing to form a passage therebetween, said partitions separating the interior of the housing into a lower chamber, an intermediate chamber and an upper chamber, said passage communicating the lower chamber with the upper chamber, said upper partition having an outwardly projecting beaded valve seat and an opening communicating the upper chamber with the intermediate chamber, a valve having a composition surface arranged to engage said seat to close said opening, yieldable means for normally maintaining the valve against its seat, said lower partition having an opening registering with the opening in the upper partition, a thermal responsive device having a bellows positioned in said intermediate chamber and provided with an axially slidable depending tubular portion extending through the opening in the lower partition and into said lower chamber, packing means on said tubular portion and sildably engaging the wall of the opening in said lower partition to prevent escape of fluid from the lower chamber into the intermediate chamber, and means for operatively connecting the bellows to the valve to raise the latter when the bellows is expanded upon the fluid in the lower chamber reaching a predetermined temperature.

4. A relief valve comprising a housing provided with vertically spaced upper and lower transverse partitions connected at their inner ends by a vertical wall spaced from the adjacent wall of the housing to form a passage therebetween, said partitions separating the interior of the housing into a lower chamber, an intermediate chamber and an upper chamber, said passage communicating the lower chamber with the upper chamber, said upper partition having an outwardly projecting beaded seat and an opening communicating the upper chamber with the intermediate chamber, a valve having a composition surface arranged to engage said seat to close said opening, yieldable means for normally maintaining the valve against its seat, said lower partition having an opening registering with the opening in the upper partition, said valve having a depending guide member extending through the opening in said upper partition into said intermediate chamber when the valve contacts its seat, a thermal responsive device axially displaceable in said housing and having a bellows positioned in said intermediate chamber and a depending tubular portion extending through the opening in the lower partition into said lower chamber, a packing connected to said tubular portion so as to be axially movable therewith and contacting the wall of the opening in said lower partition to provide a slidable seal for preventing the escape of fluid from the lower chamber into the intermediate chamber, and said bellows having means normally spaced from said guide member and arranged to engage and raise the latter to open the valve when the bellows is expanded upon the fluid in the lower chamber reaching a predetermined temperature.

5. A relief valve comprising a housing provided with vertically spaced upper and lower transverse partitions connected at their inner ends by a vertical wall spaced from the adjacent wall of the housing to form a passage therebetween, said partitions separating the interior of the housing into a lower chamber, an intermediate chamber and an upper chamber, said passage communicating the lower chamber with the upper chamber, said housing having an inlet port communicating with said lower chamber and an outlet port communicating with said intermediate chamber, said partitions having aligned openings, the wall of the opening in said upper partition having a ring member removably mounted therein, said ring member having a beaded valve seat, a reciprocating valve in said upper chamber and adapted to engage said seat to close communication between the upper chamber and the intermediate chamber, a cap connected to the valve and closing the top of the upper chamber, yieldable means confined between the cap and the valve and coacting with the pressure of the fluid in said upper chamber for normally maintaining the valve against its seat, an axially displaceable thermal responsive device including a bellows insertable in said intermediate chamber through the opening in said upper partition when the cap and ring member are removed, said device having a depending tubular portion extending through the opening in the lower partition into the lower chamber and the inlet port, packing means on said tubular portion for providing a liquid seal between the thermal element and the wall of the opening in said lower partition to prevent fluid from escaping from the lower chamber into the intermediate chamber, means for operatively connecting said thermal responsive device to said valve to move the latter away from its seat and for balancing the pressure of the fluid on opposite sides of the valve when the valve is closed to prevent excessive pressure of the valve against its seat, said thermal responsive device being operable when the temperature of the fluid introduced into the inlet port and the lower chamber reaches a predetermined point to actuate said means so as to open said valve.

6. A relief valve as called for in claim 5 in which the opening in the upper partition is of larger diameter than the bellows so that the thermal responsive device and valve seat are insertable in or movable from the top of the housing when the cap is detached therefrom.

7. A relief valve including a housing provided with vertically spaced upper and lower transverse partitions connected at their inner ends by a vertical wall spaced from the adjacent wall of the housing to form a vertical passage therebetween, said partitions separating the interior of the housing into a lower chamber, an intermediate chamber and an upper chamber, said passage communicating the lower chamber with the upper chamber, said partitions having vertically aligned openings, said upper partition having an annular valve seat adjacent its opening, a cap connected to the housing and closing said upper chamber, a reciprocating valve in said upper chamber and arranged normally to be moved into closed engagement with said valve seat so as to cut off the flow of the fluid from the upper chamber into the intermediate chamber, yieldable means confined between said valve and said cap and coacting with the pressure of the fluid delivered to the upper chamber through said passage for normally moving and maintaining the valve against its seat, said valve having a depending guide extending through the opening in the upper partition and projecting into said intermediate chamber when the valve is closed, said housing having an inlet port communicating with said lower chamber and an outlet port communicating with said intermediate chamber, a tubular thermal responsive device extending axially through said inlet and said lower chamber through the opening in the lower partition and into said intermediate chamber, said device having at its upper end a flexible metal bellows positioned within the intermediate chamber, said device having an annular shoulder engaging the wall of the opening in the lower partition, a packing between said device and the wall of said last mentioned opening to provide a seal to permit axial movement of the thermal responsive device, and a stop shoulder on said device between said lower partition and said bellows for limiting the downward movement of the latter.

8. A relief valve as called for in claim 7 in which the opening in the upper partition is larger than the opening in the lower partition and said bellows so that the thermal responsive device and valve seat are insertable in or removable from the top of the housing when the cap is detached therefrom.

FRANK H. MUELLER.
EARL E. TINKER.

References Cited in the file of this patent

UNITED STATES PATENTS

| Number | Name | Date |
|---|---|---|
| 758,970 | Jackson | May 3, 1904 |
| 2,052,769 | Hoesel | Sept. 1, 1936 |
| 2,145,925 | Geisel | Feb. 7, 1939 |
| 2,400,615 | Warrick et al. | May 21, 1946 |
| 2,553,347 | Work | May 15, 1951 |

FOREIGN PATENTS

| Number | Country | Date |
|---|---|---|
| 557,211 | Germany | Aug. 19, 1932 |